(12) United States Patent
Buckingham et al.

(10) Patent No.: US 7,597,114 B2
(45) Date of Patent: Oct. 6, 2009

(54) VENTING DEVICE

(75) Inventors: David G. Buckingham, Berkley, MI (US); Thomas H. Lappin, Casco, MI (US); Fawaz M. Elzib, Windsor (CA)

(73) Assignee: Chrysler Group LLC, Auburn Hills, MI (US)

( * ) Notice: Subject to any disclaimer, the term of this patent is extended or adjusted under 35 U.S.C. 154(b) by 298 days.

(21) Appl. No.: 11/373,660

(22) Filed: Mar. 10, 2006

(65) Prior Publication Data

US 2007/0209714 A1      Sep. 13, 2007

(51) Int. Cl.
*F16K 31/18* (2006.01)

(52) U.S. Cl. .................. 137/433; 137/429; 74/606 R (58) Field of Classification Search .......... 137/429, 137/430, 433, 197, 583; 55/385.4, 320, 510; 74/606 R
See application file for complete search history.

(56) References Cited

U.S. PATENT DOCUMENTS

| 1,629,789 | A | * | 5/1927 | Harrison ................ 137/202 |
| 1,851,084 | A | * | 3/1932 | Brown et al. ............ 137/430 |
| 2,393,078 | A | * | 1/1946 | Wager ................... 137/388 |
| 2,603,230 | A | * | 7/1952 | Krieger, Jr. ............ 137/202 |
| 2,756,766 | A | * | 7/1956 | Tronic .................. 137/397 |
| 2,972,355 | A | * | 2/1961 | Schoerner et al. ........ 137/197 |
| 3,388,714 | A | * | 6/1968 | Rau ..................... 137/202 |
| 4,203,463 | A | * | 5/1980 | Ponlot et al. ........... 137/403 |
| 4,351,203 | A | * | 9/1982 | Fukunaga ................ 137/540 |
| 4,457,325 | A | * | 7/1984 | Green ................... 137/39 |
| 4,506,562 | A | * | 3/1985 | Yamaura et al. ......... 74/606 R |
| 4,635,672 | A | * | 1/1987 | Baker ................... 137/202 |
| 5,024,345 | A | * | 6/1991 | Deweerdt ............... 74/606 R |
| 5,042,519 | A | * | 8/1991 | Kerlin .................. 137/43 |
| 5,538,330 | A | | 7/1996 | Ehrlich |
| 6,016,828 | A | * | 1/2000 | Machledt ............... 137/202 |
| 6,058,969 | A | | 5/2000 | Bollwahn et al. |
| 6,138,707 | A | * | 10/2000 | Stuart .................. 137/202 |
| 6,722,991 | B2 | | 4/2004 | Chrobak et al. |
| 2005/0101390 | A1 | | 5/2005 | Wang |

FOREIGN PATENT DOCUMENTS

FR          2476790 A  *  8/1981

* cited by examiner

*Primary Examiner*—John Rivell
*Assistant Examiner*—Craig Price
(74) *Attorney, Agent, or Firm*—Ralph E. Smith (57) ABSTRACT

A venting device including one or more seals, one or more floats, and a cap is provided. The one or more seals and the one or more floats are encapsulated by the cap. The venting device further includes a passage, which allows intake and exhaust of air from a driveline component. The one or more floats are capable of moving from a first position to a second position in the passage. The one or more seals close the passage when the one or more floats are at the second position, thereby restricting intake of water in the driveline component.

12 Claims, 7 Drawing Sheets

VENTING DEVICE

FIELD OF THE INVENTION

The present invention generally relates to a driveline of a vehicle. More particularly, the present invention relates to a venting device for intake and exhaust of air from a driveline component.

BACKGROUND OF THE INVENTION

A vehicle's driveline component such as an axle, a transmission, a transfer case, or other component that transmits power from its engine for vehicular motion, gets heated during operation. As the component heats up, the air inside the component also heats and expands. Similarly, as the driveline component cools down, the air inside the component shrinks. Both of these situations produce a pressure difference between the air inside the driveline component and the ambient air, which must be relieved using a venting device. A positive pressure difference may force air out of the component along an unfavorable path, taking lubricant with it. A negative pressure difference may cause water or other contamination to be drawn in through the component seals, or cause the seals to wear at a faster rate. In general, a venting device is installed on a driveline component to provide a passage for intake and exhaust of air between the driveline component and an external environment. The external environment can be an open air device or the outside atmosphere. Air flows into and out of the driveline component, based on a difference in pressure with respect to the atmosphere. At high driveline component temperatures, the air inside the component flows out to the atmosphere, and at low driveline component temperatures, the air flows into the component from the atmosphere. Typically, the venting device allows flow of air from the atmosphere into/out of a front axle, a rear axle, a transmission or transfer case of a vehicle.

Various venting devices are available in the automotive industry. For example, a jiggle cap vent, a jiggle cap vent with a spring and flow restrictor, a hose and cap assembly, a hydrophobic vent, etc. However, the available venting devices have one or more limitations. The existing venting devices have a number of machined components, and therefore, they are expensive to manufacture. The jiggle cap vents are usually short and can easily become clogged with mud. In addition to these limitations, one or more of the existing venting devices do not allow the driveline components to breathe air freely. Further, one or more of these devices also allows intake of water to some extent. The intake of water is not acceptable as it causes corrosion and contaminates the lubricant, reducing the life of the driveline components.

Therefore, there is a need for a venting device, which can allow unrestricted intake and exhaust of air from the driveline component. Further, the venting device should also be able to restrict intake of water into the driveline component. Moreover, it is preferable to have a venting device that is light in weight, and relatively inexpensive to manufacture.

SUMMARY OF THE INVENTION

It is an object of the present invention to provide a venting device that allows unrestricted intake and exhaust of air from a driveline component.

Another object of the present invention is to provide a venting device that prevents intake of water from an external environment to the driveline component.

Yet another object of the present invention is to provide a venting device that is light in weight, and is relatively inexpensive to manufacture.

The present invention provides a venting device with one or more seals, one or more floats and a cap. The one or more seals are coupled with the one or more floats. The cap encapsulates the one or more seals and the one or more floats. Further, the venting device includes a passage, which allows intake and exhaust of air from a driveline component. The one or more floats are pushed by water trying to enter in the venting device through the passage. This causes the one or more floats to move from a first position to a second position in the passage. At the second position, the one or more seals close the passage, thereby restricting intake of water into the driveline component.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION

Various embodiments of the present invention describe a venting device. The venting device can be attached to a driveline component. The driveline component may be a front axle, a rear axle, a transmission, a transfer case, or similar component. The venting device includes one or more seals, one or more floats, and a cap. The one or more floats are coupled to the one or more seals. The one or more seals and the one or more floats are encapsulated by the cap. The venting device further includes a passage which allows intake and exhaust of air from the driveline component. The one or more floats are pushed by the water trying to enter the passage. This causes the one or more floats to move from a first position to a second position in the passage. At the second position, the one or more seals close the passage, thereby restricting intake of water into the driveline component.

Figure 1:
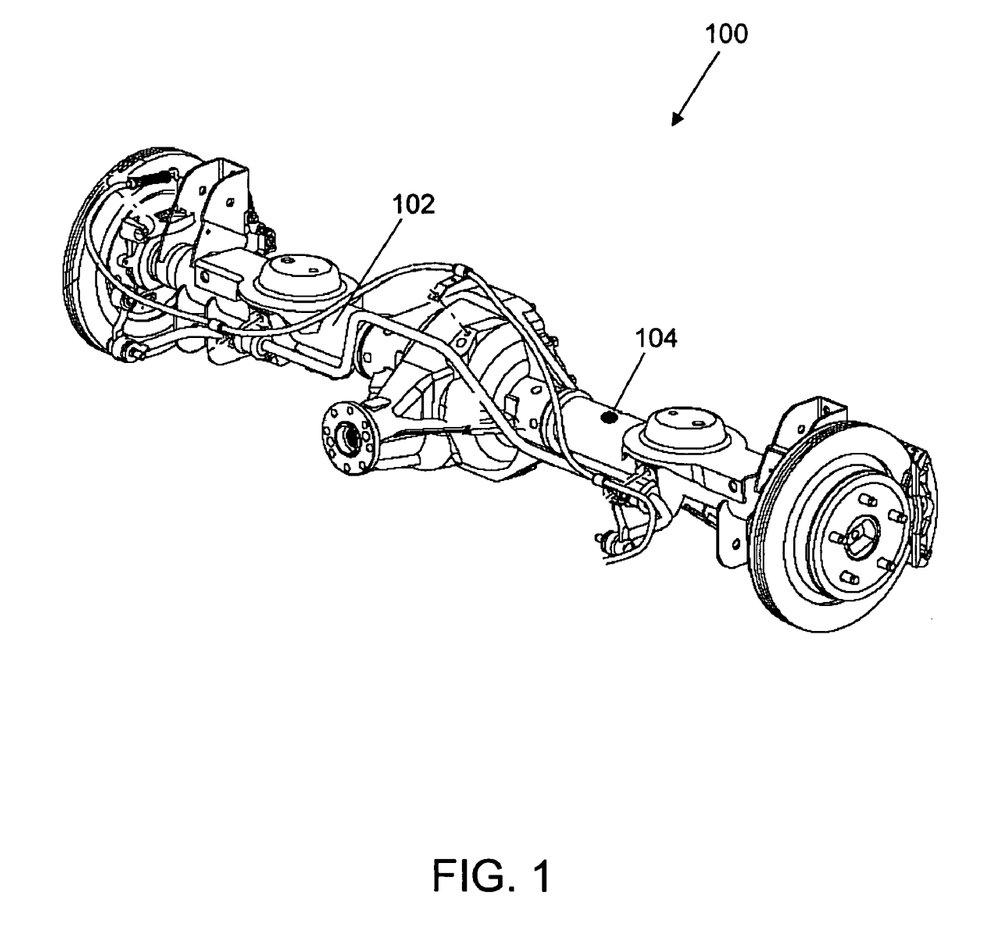
FIG. 1 is a view of an axle assembly, in accordance with various embodiments of the present invention.

FIG. 1 is a view of an axle assembly 100, in accordance with various embodiments of the present invention. Axle assembly 100 is a structural component of a vehicle, which is capable of maintaining the position of the wheels that are placed relative to each other, and to the body of the vehicle. Axle assembly 100 includes an axle 102 and a vent slot 104.

Axle 102 can be a rear axle or a front axle of the vehicle. There is a continuous change in temperature during normal operation of axle 102 causing a warming up and a cooling down of axle assembly 100. During warm up, air inside axle 102 flows out through the vent slot 104, and during cool down, air flows into axle 102 from the external environment. To allow unrestricted flow of air into/out of axle 102, a venting device may be connected to vent slot 104. It may be apparent to a person skilled in the art that the venting device may be connected to the other driveline components as well.

Figure 2:
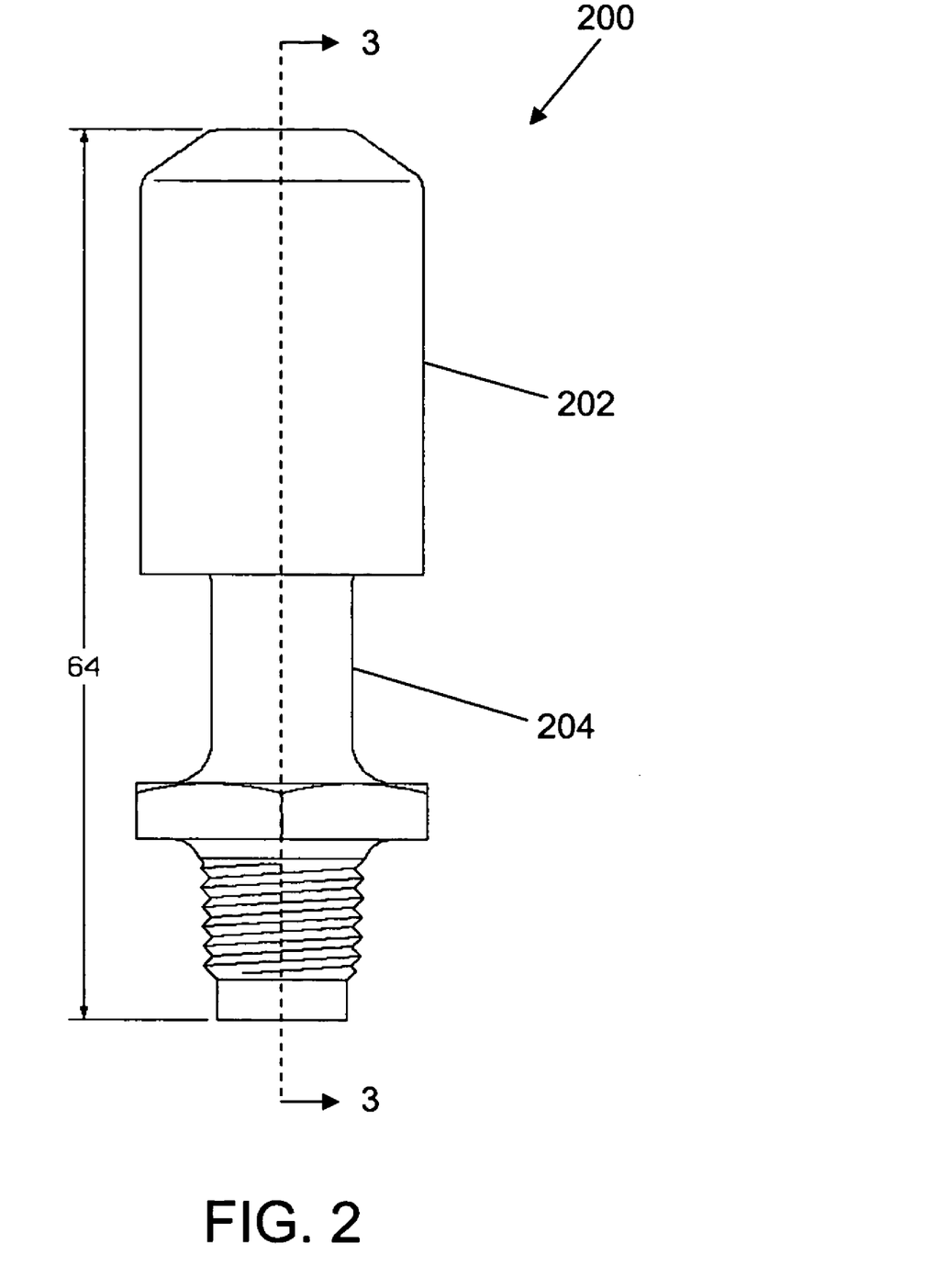
FIG. 2 is a view of a venting device, in accordance with an embodiment of the present invention.

FIG. 2 is a view of a venting device 200, in accordance with an embodiment of the present invention. In an embodiment of the present invention, length of venting device 200 is 64 millimeters (mm). Venting device 200 includes a cap 202 and a base 204. Cap 202 can be a hollow cylinder with a closed end. Cap 202 is described in detail in conjunction with FIG. 3. Base 204 has a hollow passage. The hollow passage extends throughout the length of base 204. The two extreme ends of base 204 are referred to as a first end and a second end. Base 204 has the first end attached to cap 202. In an embodiment of the present invention, cap 202 forms a push-fit joint with base 204. In another embodiment of the present invention, cap 202 is adhered by base 204 using an adhesive. In yet another embodiment of the present invention, cap 202 is adhered by base 204 using a twist and lock feature. The second end of base 204 can be connected to axle 102 at vent slot 104. Base 204 is further described in detail in conjunction with FIG. 4. Cap 202 and base 204 can be made of plastic. In an embodiment of the present invention, cap 202 and base 204 are made using nylon 4/6.

Figure 3:
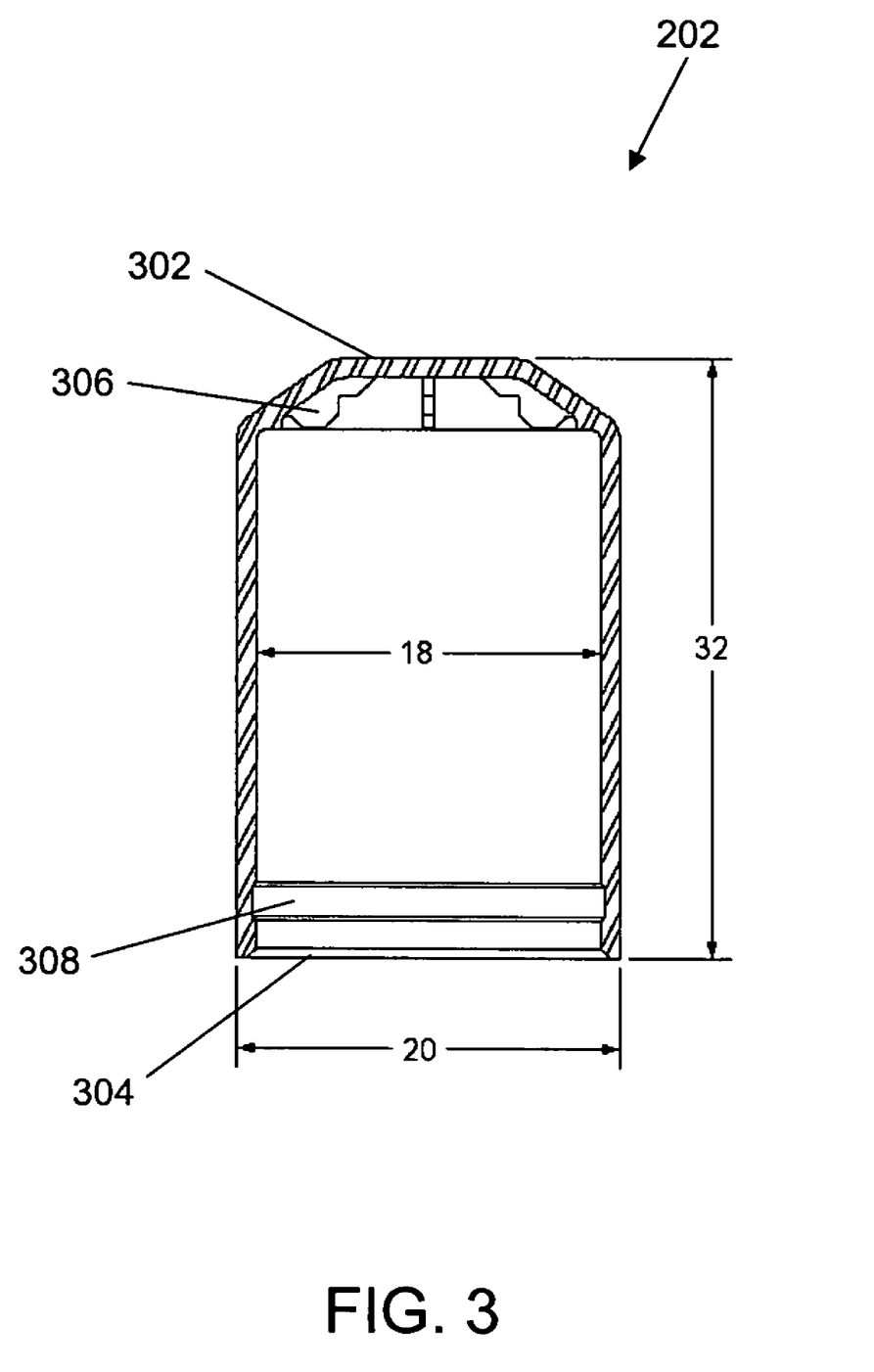
FIG. 3 is a cross-sectional view of a cap through a cut line 3-3 of FIG. 2, in accordance with an exemplary embodiment of the present invention.

FIG. 3 is a cross-sectional view of cap 202 through cut line 3-3 of FIG. 2, in accordance with an exemplary embodiment of the present invention. Cap 202 can be a hollow cylinder with a closed end 302 and an open end 304. In an embodiment of the present invention, the hollow cylinder has an inner diameter 18 mm, an external diameter 20 mm and a height of 32 mm. Cap 202 has grooves machined in the inner circumference near the open end 304. In an embodiment of the present invention, cap 202 has one groove 308 at the inner circumference near the open end 304. Further, groove 308 is perpendicular to the axis of the cap. Groove 308 has a depth of 0.2 mm from the inner surface of cap 202. A plurality of ribs 306 are located at closed end 302 to support a tube in venting device 200.

Figure 4:
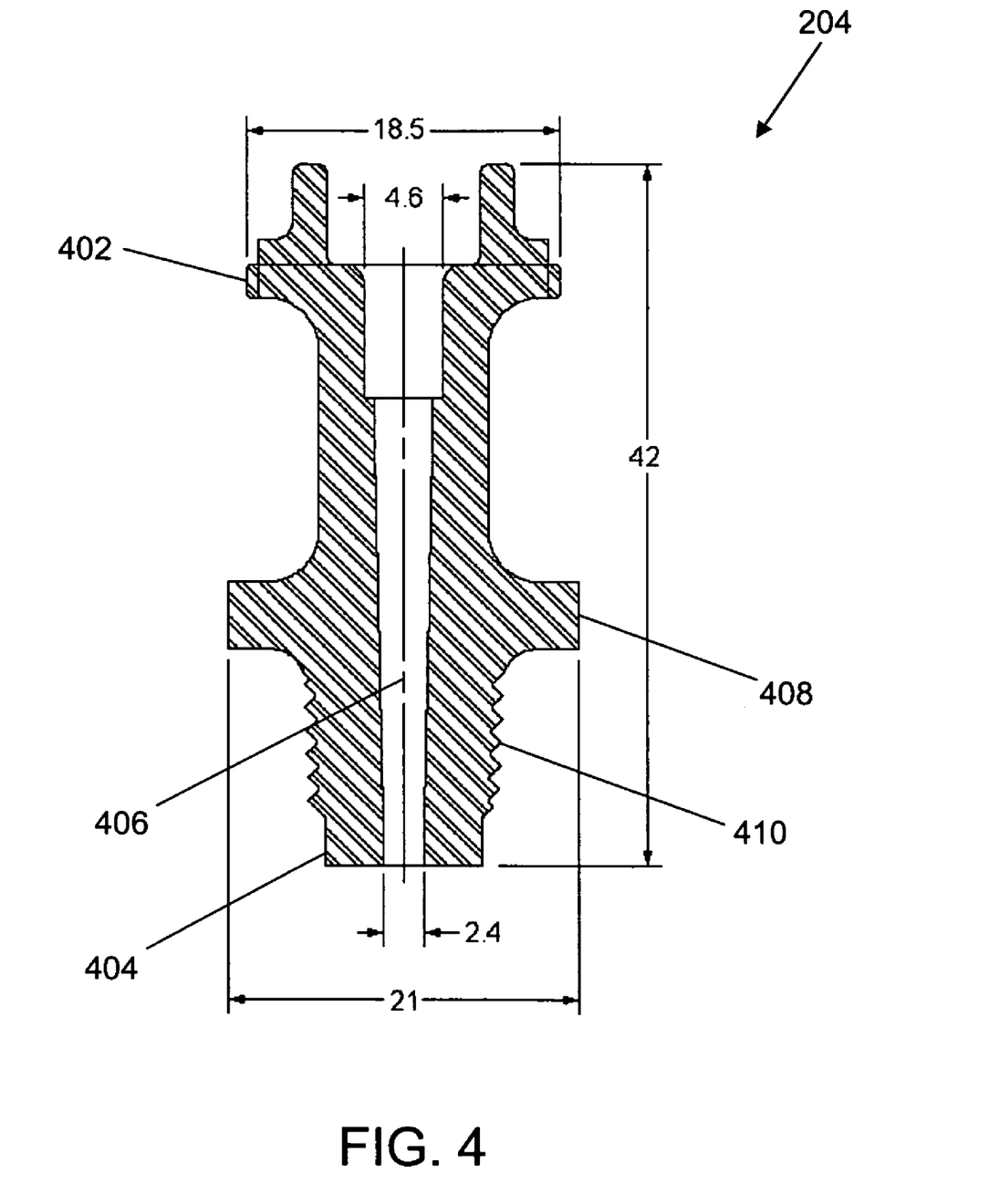
FIG. 4 is a cross-sectional view of the base through the cut line 3-3 of FIG. 2, in accordance with an exemplary embodiment of the present invention.

FIG. 4 is a cross-sectional view of base 204 through cut line 3-3 of FIG. 2, in accordance with an exemplary embodiment of the present invention. Base 204 includes a first end 402, a second end 404 and a hollow passage 406. Hollow passage 406 extends from a first end 402 to the second end 404. In an embodiment of the present invention, base 204 has a height of 42 mm; hollow passage 406 has a diameter ranging from 2.4 mm-4.6 mm; first end 402 has an external diameter of 18.5 mm and an inner diameter of 4.6 mm; second end 404 has an inner diameter of 2.4 mm. Further, second end 404 has a tapered thread 410, which is attached to vent slot 104. In an embodiment of the present invention, the tapered thread 410 has 7/16 inch-20 unified national fine (UNF) threads. In an embodiment of the present invention, base 204 has a 21 mm hexagon 408 for installing the venting device 200 using an axial driver.

Figure 5:
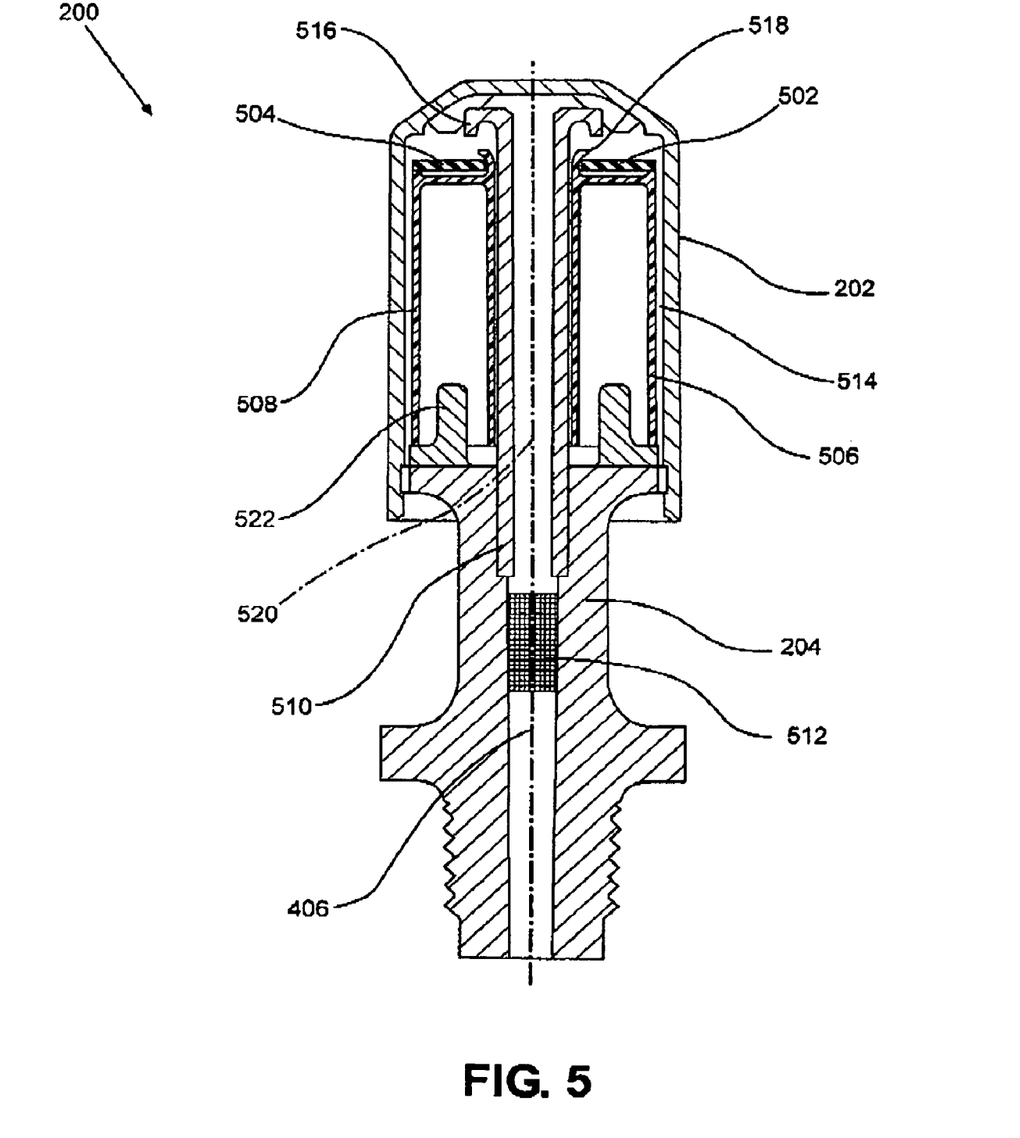
FIG. 5 is a cross-sectional view of the venting device through the cut line 3-3 of FIG. 2, in accordance with an embodiment of the present invention.

FIG. 5 is a cross-sectional view of venting device 200 through cut line 3-3 of FIG. 2, in accordance with an embodiment of the present invention. Venting device 200 includes, in addition to cap 202 and base 204, one or more seals such as seals 502 and 504, one or more floats such as floats 506 and 508, a tube 510, and a filter 512. In another embodiment of the present invention, venting device 200 includes one seal and one float only. In another embodiment of the present invention, the float is a circular float, and the seal is a circular seal. The circular float can be a hollow co-axial cylinder with one side closed. The circular seal can be a rubber seal with a circular shape.

In accordance with various embodiments of the present invention, floats 506 and 508 can be hollow cuboids, hollow cylinders, and so forth. In an embodiment of the present invention, floats 506 and 508 have a height of 20 mm, a width of 5.9 mm, and wall thickness of 0.5 mm. The one or more floats can be manufactured using nylon 4/6, which makes it light-weight and temperature resistant. Seals 502 and 504 are made of rubber. In an embodiment of the present invention, seals 502 and 504 are made from Hydrogenated Nitrile Butadiene Rubber (HNBR) 60 durometer. The one or more floats are coupled to the one or more seals. The coupling can be such that the one or more seals are adhered to the one or more floats. In an embodiment of the present invention, seals 502 and 504 are adhered at the first end of floats 506 and 508, respectively. Cap 202 encapsulates the one or more seals and the one or more floats. Cap 202 forms a push-fit joint with base 204. In an embodiment of the present invention, base 204 has one or more error-proofing tabs 522, which prevent the one or more floats from being assembled upside down in venting device 200. Base 204 has filter 512 present inside hollow passage 406. Filter 512 is used to separate oil and other particulates from air flowing through hollow passage 406.

Hollow passage 406 in base 204 is extended by tube 510, which provides an internal passage 520 to intake and exhaust air from base 204. Tube 510 has a first end connected to cap 202, and a second end connected to base 204. In an embodiment of the present invention, the second end of tube 510 is connected to base 204 through an interference fit. In another embodiment of the present invention, cap 202 supports the first end of tube 510. Tube 510 and cap 202 form a passage 514, which provides a path for air to travel into and out of the driveline component. In an embodiment of the present invention, passage 514 is 0.6 mm in width. The first end of tube 510 has overhangs 516, to accommodate one or more seal retainers such as retainer 518. One or more seals retainers 518 secure the one or more seals to the one or more floats. Tube 510 is centered within cap 202 by using one or more internal ribs present in cap 202. The axial position of tube 510 can also be maintained by the internal ribs. In an embodiment of the present invention, the one or more internal ribs prevent the one or more seals from buckling.

Figure 6:
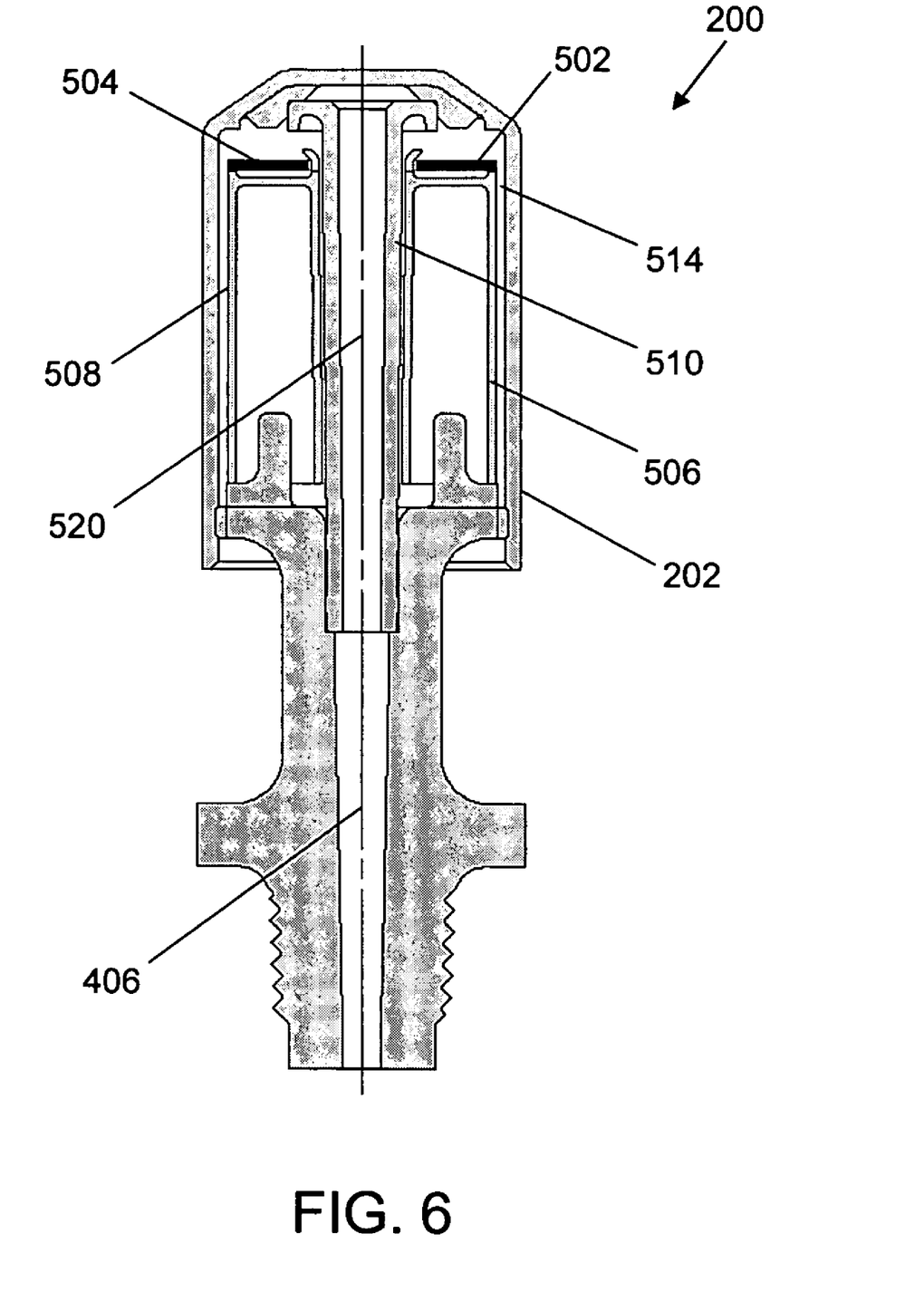
FIG. 6 is a cross-sectional view of the venting device through the cut line 3-3 of FIG. 2, showing a float in a first position, in accordance with an embodiment of the present invention.

FIG. 6 is a cross-sectional view of venting device 200 showing a first position of the one or more floats, in accordance with an embodiment of the present invention. Seals 502 and 504 do not block passage 514 at the first position of the floats 506 and 508. The floats 506 and 508 are capable of moving in passage 514. An unrestricted intake and exhaust of air takes place in the first position of the floats 506 and 508 between axle 102 and the external environment. An intake and exhaust of air from axle 102 occurs through passage 514, internal passage 520 and hollow passage 406 in venting device 200. At high temperatures of the driveline component, air flows out of axle 102 to an external environment through venting device 200. Similarly, at low temperatures of the driveline component, air flows from the external environment into axle 102.

Figure 7:
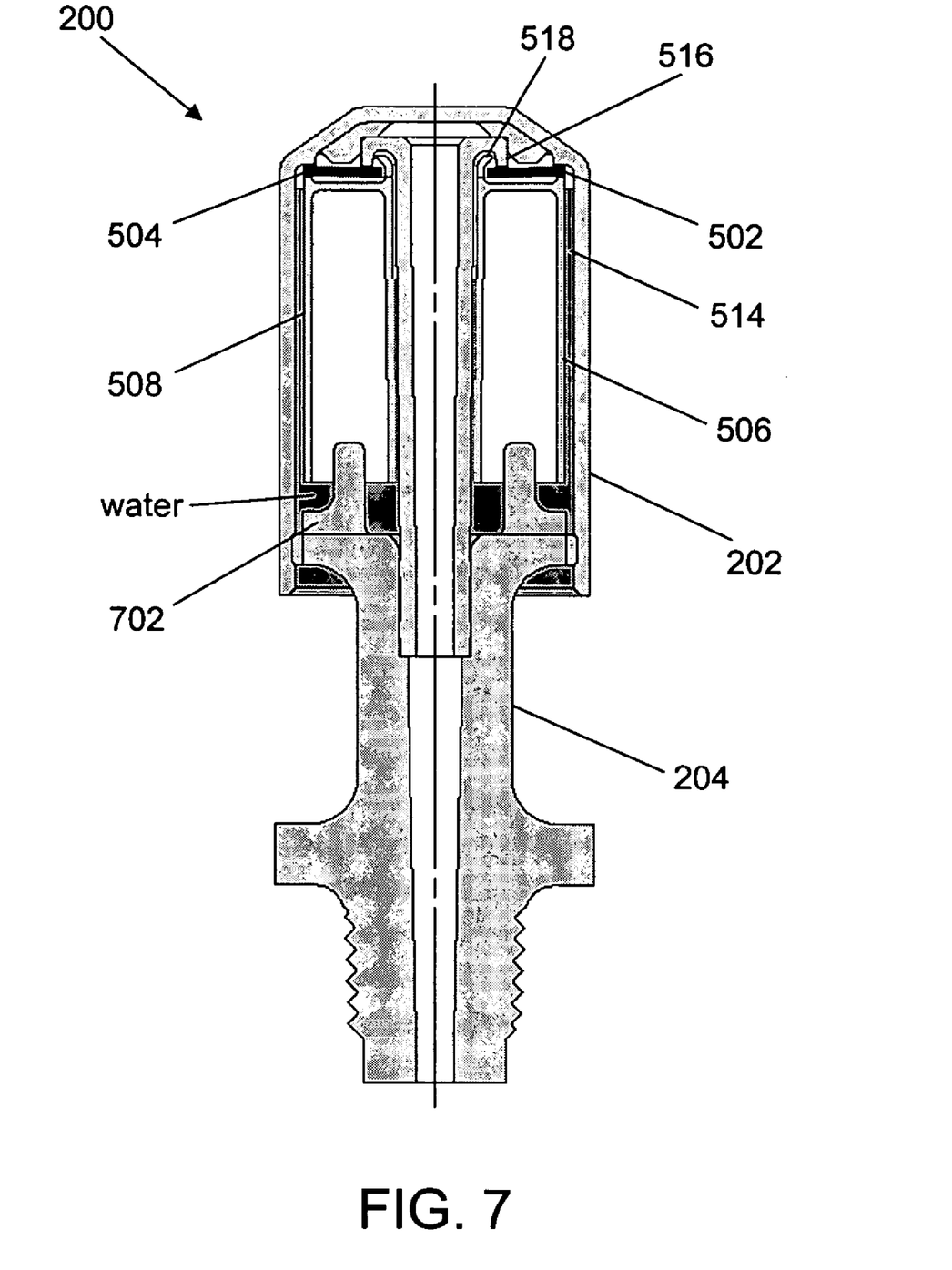
FIG. 7 is a cross-sectional view of the venting device through the cut line 3-3 of FIG. 2, showing the float in a second position, in accordance with an embodiment of the present invention.

FIG. 7 is a cross-sectional view of venting device 200 showing a second position of the one or more floats, in accordance with an embodiment of the present invention. Seals 502 and 504 block passage 514 at the second position of the one or more floats. Blocking of passage 514 restricts the intake of water in the venting device 200 from the external environment. In an embodiment of the present invention, the one or more floats include one or more float-rests 702. One or more float-rests 702 allow water to enter a cavity beneath the one or more floats. In an embodiment of the present invention, overhangs 516 accommodate one or more retainers 518 at the second position.

Various embodiments of the present invention further describe a vent assembly that allows an intake and exhaust of air from a driveline component. The vent assembly prevents intake of water into the driveline component. The vent assembly includes one or more seals, one or more floats, a cap, a passage, a base and a tube. The one or more seals are coupled to the one or more floats. The cap encapsulates the one or more seals and the one or more floats. The cap and the tube form the passage that allows the intake and exhaust of air from the driveline component. The tube connects the passage with the base. A first end of the tube can be connected to the cap, and a second end of the tube is connected to the base. The tube forms an internal passage connecting the passage to the base. The base has a first end attached to the cap and a second end attached to the driveline component. The base has a hollow passage extending from the first end to the second end. The internal passage is connected to the hollow passage. While operating, the one or more floats are pushed from a first position to a second position in the passage. At the second position, the one or more seals close the passage which restricts the intake of water into the driveline component. The venting assembly is further capable of providing an unrestricted path for air to move into/out of the driveline component. A filter installed in the base filters the air flowing through the hollow passage.

Various embodiments of the present invention describe a driveline assembly including an axle and the venting device. The venting device can be installed on the axle. The venting device is capable of unrestricted intake and exhaust of air into/out of the axle. Further, the venting device is capable of restricting intake of water into the axle.

An advantage of the venting device is that it allows unrestricted intake and exhaust of air between the external environment, and the driveline component. This results in increased life of the driveline component seals. Further, the venting device restricts intake of water from the external environment into the driveline component. This prevents the lubricant from being contaminated, which would reduce the operational life of the driveline component. The venting device can be manufactured by using plastic and rubber, which makes the venting device light in weight and relative inexpensive to manufacture.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention, as described in the claims.

What is claimed is:

1. A venting device comprising:
    a base having first and second ends with one of the first and second ends connected to a driveline component and the base having a first internal vent through-passage formed therein extending from the first end to the second end;
    a tube formed of a tubular sidewall having a first and second ends with a second internal vent through-passage disposed therein with one of the first and second tube ends attached to the base with the second internal vent passage in the tube in fluid flow communication with the first internal vent passage in the base;
    a cap attached to the other one of the first and second ends of the base and permitting fluid flow therebetween with the cap surrounding an end of the tube and comprising a sidewall attached to the base enclosing the tube in an enclosure defined between the cap and the base and an endwall with at least one internally disposed transversely or radially extending rib that spaces the other one of the first and second tube ends from the cap endwall permitting fluid flow between the tube and the cap end wall;
    a passage defined by a space between the cap and the tube, the passage routing intake and exhaust air between the driveline component that is one of a front axle, a rear axle, a transmission and a transfer case and an external environment;
    a float movable between a first position and a second position, the float moving to the second position in response to a liquid flow into the passage from the external environment;
    a seal coupled to the float so that the seal closes the passage when the float is moved to the second position preventing the liquid flow from reaching the driveline component; and
    wherein the at least one internally disposed rib in the cap prevents buckling of the seal when the float is moved to the second position.

2. The venting device according to claim 1, further comprising a filter disposed within the first internal vent passage in the base that is configured to separate oil and particulates from air flowing through the vent passage.

3. The venting device according to claim 1, wherein the base further comprises at least one float-rest, the float having a cavity formed in one end, and the at least one float-rest allowing water to enter the cavity in the float.

4. The venting device according to claim 3, wherein the base further comprises at least one error-proofing-tab that cooperates with the at least one float preventing the at least one float from being assembled upside down.

5. The venting device according to claim 1, wherein the float has a seal retainer that attaches the seal to the float, and the end of the tube has an overhang that receives the seal retainer when the float is moved to the second position.

6. The venting device according to claim 1, wherein the float is made of plastic.

7. The venting device according to claim 1, wherein the seal is made of rubber.

8. A venting device comprising:
    a base connected to a driveline component and having a hollow passage for routing intake and exhaust air between the driveline component and an external environment outside the venting device;
    a tube having an internal passage communicating with the hollow passage of the base;
    a cap having an endwall from which a tubular sidewall extends outwardly surrounding a portion of the tube with the cap attached to the base adjacent an open end thereof;
    a passage defined by a space between the cap and the portion of the tube, the passage having one end communicating with the internal passage of the tube and another end communicating with the external environment;
    a float disposed between the cap and the tube that is movable relative to the cap and the tube between a first position and a second position, the float moving to the second position in response to a liquid flow into the passage from the external environment outside the venting device;

a seal attached to the float that closes the passage when the float is moved to the second position opposing the liquid flow from entering the driveline component;

wherein the tube has an elongate tubular sidewall having one end that is attached to the cap endwall and that comprises an outwardly extending flange with an outer peripheral overhang lip spaced from the tube sidewall defining a gap therebetween and having an opposite end attached to the base;

wherein the float comprises an outwardly extending seal retainer finger that is received in the gap between the overhang lip and tube sidewall with the overhang lip bearing against the seal when the float is disposed in the second position; and wherein the driveline component comprises one of a front axle, a rear axle, a transmission, and a transfer case.

9. The venting device according to claim 8 further comprising a filter disposed within the hollow passage to separate oil and particulates from air flowing through the hollow passage.

10. A driveline assembly comprising:

an axle assembly having a vent port; and a venting device connected to the vent port, the venting device comprising:

a base having a first end and a second end connected to the axle assembly, the base further having a hollow passage extending from the first end to the second end for muting intake air to and exhaust air from the axle assembly;

a tube formed of a tubular sidewall having an internal passage therein communicating with the hollow passage in the base;

a cap supporting and surrounding a portion of the tube with the cap comprising a tubular sidewall extending outwardly from an endwall that has at least one internally disposed rib from which one end of the tube extends permitting fluid flow between the one end of the tube and the cap endwall;

an outer passage defined between the cap and the portion of the tube, the outer passage communicating with the internal passage of the tube;

a float movable between a first position and a second position, the float moving to the second position in response to a liquid flow into the outer passage; and a seal coupled to the float so that the seal closes the outer passage when the float is moved to the second position preventing liquid flow into the axle assembly;

wherein the cap engages the base and houses the float and the seal;

wherein the one end of the tube comprises an outwardly extending flange with an outer peripheral overhang lip spaced from the tube sidewall defining a gap therebetween and having an opposite end attached to the base; and wherein the float comprises a seal retainer that is received in the gap between the overhang lip and tube sidewall with the overhang bearing against the seal when the float is disposed in the second position.

11. The driveline assembly according to claim 10, wherein the venting device further comprises a filter disposed inside the hollow passage in the base to separate oil and particulates from air flowing through the hollow passage in the base.

12. The driveline assembly according to claim 10, wherein the axle assembly is one of a front axle and a rear axle.

* * * * *